(12) United States Patent
Saito

(10) Patent No.: US 8,282,263 B2
(45) Date of Patent: Oct. 9, 2012

(54) APPARATUS AND METHOD FOR ADDING WET ASH TO CEMENT

(75) Inventor: Shinichiro Saito, Kumagaya (JP)

(73) Assignee: Taiheiyo Cement Corporation (JP)

( * ) Notice: Subject to any disclaimer, the term of this patent is extended or adjusted under 35 U.S.C. 154(b) by 1113 days.

(21) Appl. No.: 12/088,932

(22) PCT Filed: Oct. 17, 2006

(86) PCT No.: PCT/JP2006/320604
§ 371 (c)(1),
(2), (4) Date: Apr. 1, 2008

(87) PCT Pub. No.: WO2007/052464
PCT Pub. Date: May 10, 2007

(65) Prior Publication Data
US 2010/0147196 A1    Jun. 17, 2010

(30) Foreign Application Priority Data
Oct. 31, 2005   (JP) ................................. 2005-315608

(51) Int. Cl.
*B28C 5/00* (2006.01)
(52) U.S. Cl. .......................................... 366/10; 366/22
(58) Field of Classification Search ................. 366/6, 10, 366/22, 23, 12, 13, 24
See application file for complete search history.

(56) References Cited

U.S. PATENT DOCUMENTS 1,408,155 A * 2/1922 Allen ............................... 241/34
2,214,715 A * 9/1940 Breerwood .................... 106/756
(Continued)

FOREIGN PATENT DOCUMENTS

EP         1219336        7/2002
(Continued)

OTHER PUBLICATIONS

Toshiaki Murata, "Coal Preparation Technology for Moderation of Environmental Pollution," Journal "Doryoku (Power)" No. 248 extra issue, 1998.

(Continued)

*Primary Examiner* — Tony G Soohoo
(74) *Attorney, Agent, or Firm* — Stetina Brunda Garred & Brucker

(57) ABSTRACT

An apparatus and a method for adding wet ash to cement which make it possible to fed wet ash to a cement mill without generating cost for drying the wet ash and new setting space at the neighboring area of the entrance portion of the cement mill. The apparatus comprises a dewaterer for dewatering wet ash, a mixer 7 for mixing the wet ash with one of materials that are mixed with clinker and ground together, and a feeder 11 for feeding the mixture to a cement mill 14. After dewatered, the wet ash with predetermined quantity is mixed with the one of the materials that are mixed with clinker and ground together and fed to the mill. The water content of the wet ash after dewatered is adjusted to 20 mass percent or below, preferably to 15 mass percent or below. A centrifugal separator can be used as the dewaterer, and a pug mill may be used as the mixer. Modified ash (fly ash slurry) from fly ash decarbonization facilities can effectively be used as the wet ash by feeding it to the cement mill.

6 Claims, 1 Drawing Sheet

U.S. PATENT DOCUMENTS

| | | | | |
|---|---|---|---|---|
| 2,616,909 | A | * | 11/1952 | Carter .............................. 554/16 |
| 3,140,169 | A | * | 7/1964 | Smith et al. ................... 75/10.67 |
| 4,174,974 | A | * | 11/1979 | Fondriest ....................... 106/735 |
| 4,242,142 | A | * | 12/1980 | Gee et al. ....................... 106/714 |
| 4,560,501 | A | * | 12/1985 | Minami et al. ................ 422/131 |
| 4,872,998 | A | * | 10/1989 | Dausman et al. ............. 210/710 |
| 4,889,428 | A | * | 12/1989 | Hodson ............................. 366/1 |
| 5,019,360 | A | * | 5/1991 | Lehto ............................ 423/132 |
| 5,164,123 | A | * | 11/1992 | Goudy, Jr. .......................... 588/6 |
| 5,988,864 | A | * | 11/1999 | Bracegirdle ...................... 366/7 |
| 2010/0011995 | A1 | * | 1/2010 | Nakamura et al. ............ 106/705 |
| 2010/0147196 | A1 | * | 6/2010 | Saito ............................... 106/709 |

FOREIGN PATENT DOCUMENTS

| | | |
|---|---|---|
| JP | 5344472 | 4/1978 |
| JP | 5386720 | 7/1978 |
| JP | 61025651 | 4/1986 |
| JP | 61103992 | 5/1986 |
| JP | 61106698 | 5/1986 |
| JP | 2116649 | 5/1990 |
| JP | 3221147 | 9/1991 |
| JP | 044032 | 8/1992 |
| JP | 5238788 | 9/1993 |
| JP | 5293385 | 11/1993 |
| JP | 6157089 | 6/1994 |
| JP | 6335700 | 6/1994 |
| JP | 06063335 | 8/1994 |
| JP | 775720 | 3/1995 |
| JP | 7204604 | 8/1995 |
| JP | 7213950 | 9/1995 |
| JP | 7299331 | 11/1995 |
| JP | 8108038 | 4/1996 |
| JP | 08057351 | 5/1996 |
| JP | 09225441 | 2/1997 |
| JP | 9227184 | 9/1997 |
| JP | 09295841 | 11/1997 |
| JP | 9301751 | 11/1997 |
| JP | 10230137 | 9/1998 |
| JP | 11010131 | 1/1999 |
| JP | 11100243 | 4/1999 |
| JP | 11244826 | 9/1999 |
| JP | 11347548 | 12/1999 |
| JP | 200024625 | 1/2000 |
| JP | 2000146458 | 5/2000 |
| JP | 2001198434 | 7/2001 |
| JP | 2002180146 | 6/2002 |
| JP | 2002219335 | 8/2002 |
| JP | 2002282639 | 10/2002 |
| JP | 2002355531 | 12/2002 |
| JP | 2003266057 | 9/2003 |
| JP | 2003284973 | 10/2003 |
| JP | 200466229 | 4/2004 |
| JP | 2004313833 | 11/2004 |
| JP | 2005104792 | 4/2005 |
| WO | WO2004/052801 | 6/2004 |

OTHER PUBLICATIONS

Mitsui Engineering & Shipbuilding Co., LTD., "De-Ashing and De-Sulfurizing Equipment Based on M-COL Technology," Journal, No. 154, 1995.

Mitsui Engineering & Shipbuilding Co., LTD., "Fine M-COL," Journal, No. 170, 2000.

Mitsui Engineering & Shipbuilding Co., LTD., "Development of Clean Coal Fuel (M-COL) System," Journal, No. 171, 2000.

Nishitani, Takashi, "A Basic Experiment on the Mercury Removal in Exhaust Gases from Municipal Refuse Incinerator," Osaka City Institute of Public Health and Environmental Sciences, Annual Report No. 51, 1988.

* cited by examiner

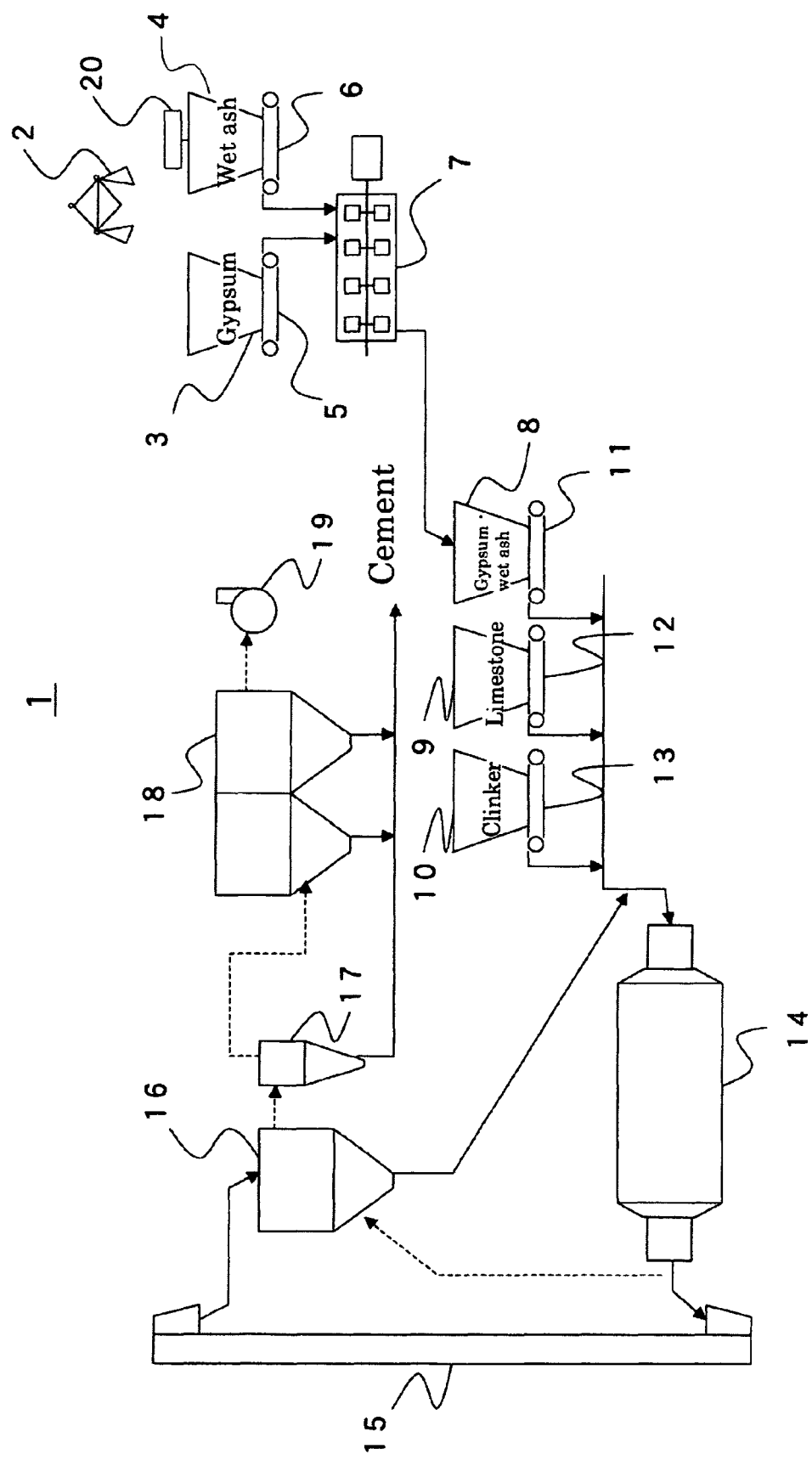

APPARATUS AND METHOD FOR ADDING WET ASH TO CEMENT

CROSS-REFERENCE TO RELATED APPLICATIONS

The present application claims priority to International Application No. PCT/JP2006/320604 which was filed on Oct. 17, 2006 and claims priority to Japanese Patent Application No. 2005-315608 filed Oct. 31, 2005.

STATEMENT RE: FEDERALLY SPONSORED RESEARCH/DEVELOPMENT

Not Applicable

BACKGROUND OF THE INVENTION

1. Technical Field of the Invention

The present invention relates to an apparatus and a method for adding wet ash to cement that can, for instance, effectively use modified ash, which is obtained by removing unburned carbon from fly ash generated in coal thermal power plants or the like, and others by feeding them to cement mills.

2. Description of the Related Art

Fly ash generated at coal thermal power plants etc. has been utilized for raw materials for cement and artificial lightweight aggregates and an additive for concrete and so on. When the fly ash is utilized for an additive for concrete, since unburned carbon included in the fly ash absorbs air-entraining water-reducing admixture and the like, the workability of the concrete is lowered. In addition, when casting the concrete, harmfully, unburned carbons float, and a black-color portion is generated at a joint portion of the cast concrete. Further, a large quantity of unburned carbon in fry ash causes a problem of lowered quality of artificial lightweight aggregate.

Then, in order to remove unburned carbon from fly ash with high unburned carbon content and effectively use the fly ash, for example, in the first patent document, a method for removing unburned carbon included in fly ash is described. The method can considerably lower unburned carbon content by adding shearing force, before flotation process, to original fly ash slurry including unburned carbon, to which a collector added.

Patent document 1: Japanese Patent 3613471 gazette

BRIEF SUMMARY OF THE INVENTION

However, when wet ash (fly ash slurry) obtained by the method described in the aforementioned first patent document and the like is fed to cement mills, it is required to dry the wet ash before feeding to a cement mill, or to dry it with heat generated at grinding in a cement mill after lowering the water content thereof. And, to obtain dried wet ash, cost for drying the wet ash is necessary. Meanwhile, in consideration of feeding the wet ash to a cement mill after reducing the water content thereof, to the cement mill, clinker, gypsum and additives such as limestone and slag are fed, so that feeders for feeding them are already installed at the neighboring area of the entrance portion of the cement mill in a crowded manner, therefore, as a problem, it is difficult to secure further space for installing a feeder for feeding wet ash to the cement mill.

The present invention has been made in consideration of the above problems, and the object thereof is to provide an apparatus and a method for adding wet ash to cement, without generating drying cost and new setting space in the neighboring are of the entrance portion of a cement mill.

To achieve the above object, an apparatus for adding wet ash to cement according to the present invention is characterized by comprising: a dewaterer for dewatering wet ash; a mixer for mixing the wet ash dewatered by the dewaterer with one of materials that are mixed with clinker and ground together; and a feeder for feeding the mixture of the wet ash and the one of the materials that are mixed with clinker and ground together, which are mixed by the mixer, to a cement mill. Here, the wet ash means a material, such as fly ash slurry, containing ash 5 mass percent or more and water 1 mass percent or more. And, the one of the materials that are mixed with clinker and ground together is selected from the group consisting of gypsum and additives such as limestone and slag that are fed to a cement mill with clinker and ground together in the mill.

With the present invention, wet ash is dewatered by a dewaterer, and mixed with one of materials that are mixed with clinker and ground together by a mixer, and the mixture of the wet ash and the one of materials that are mixed with clinker and ground together, which are mixed by the mixer, is fed to a cement mill, so that the wet ash can be dried by heat generated at grinding in the cement mill, which allows cost for drying the wet ash when fed to the cement mill not to be generated. In addition, the wet ash can be fed, together with one of materials that are mixed with clinker and ground together, to the cement mill by a feeder, so that it is unnecessary to install a feeder for the wet ash in exclusive use and to prepare new setting space for the feeder at the neighboring area of the entrance portion of the cement mill.

In the above apparatus for adding wet ash to cement, it is possible that the dewaterer is a device selecting from the group consisting of centrifugal separators, vacuum dewatereres, hygroscopic-material-type dewatereres, electroosmosis-type dewatereres, air-substitution-type dewatereres and mechanical-expression-filtration-type dewatereres. In addition, in the above apparatus for adding wet ash to cement, the mixer can be a device selecting from the group consisting of pug mills, static-type mixers, body-rotation-type mixers and cranes and hoppers. Here, the crane and hopper are used for mixing wet ash and the one of materials that are mixed with clinker and ground together at predetermined rate using the crane's bucket.

Further, a method for adding wet ash to cement according to the present invention is characterized by comprising the steps of: dewatering wet ash; mixing predetermined quantity of the dewatered wet ash with one of materials that are mixed with clinker and ground together; and adding the mixed wet ash and the one of the materials that are mixed with clinker and ground together to a cement mill. With this method, as described above, cost for drying the wet ash when fed to the cement mill is not generated, and it is unnecessary to install a feeder for the wet ash in exclusive use, which makes new setting space unnecessary at the neighboring area of the entrance portion of the cement mill.

In the above method for adding wet ash to cement, water content of the wet ash after dewatered may be adjusted to 20 mass percent or below, preferably to 15 mass percent or below, which allows the wet ash after dewatered to certainly be dried with heat generated at grinding in the cement mill.

In addition, in the above method for adding wet ash to cement, the wet ash can be modified ash from fly ash decarbonization facilities. The fly ash decarbonization facility is, for example, a facility that separates unburned carbon from the fly ash through flotation process as described in the patent document 1, and the modified ash may be a wet ash, of which unburned carbon content is low, obtained in such facility.

As described above, with the apparatus and the method for adding wet ash to cement according to the present invention, when wet ash is fed to cement mills, cost for drying the wet ash is not generated, and it is unnecessary to prepare new setting space for the feeder at the neighboring area of the entrance portion of the cement mill. In addition, the wet ash is not fed to a transporter and a separator but is added just before the cement mill and passes through the mill, so that, unlike the case that the wet ash is fed to a separator, there is no fear that the mixing ratio of the wet ash with the cement changes since the wet ash returns to the cement mill or it is mixed with the product due to the change in particle size thereof, resulting in stable mixing operation and homogeneous mixture.

BRIEF DESCRIPTION OF THE DRAWINGS

FIG. 1 is a flowchart showing an example of cement grinding facility to which an apparatus and a method for adding wet ash to cement according to the present invention are applied.

DETAILED DESCRIPTION OF THE INVENTION

FIG. 1 shows an exemplary configuration of a cement grinding facility to which an apparatus and a method for adding wet ash to cement according to present invention are applied. The cement grinding facility 1 comprises a crane 2 for feeding gypsum and wet ash to a gypsum hopper 3 and a wet ash hopper 4, a pug mill 7 as a mixer for mixing the wet ash and the gypsum, which are fed by a gypsum feeder 5 and a wet ash feeder 6, hoppers 8-10 and feeders 11-13 for feeding clinker, limestone and mixture of gypsum and wet ash to a ball mill 14, the ball mill 14 for finely grinding clinker and others, a bucket elevator 15 for transporting ground powder from the ball mill 14 to a separator 16, the separator 16 for classifying the finely ground clinker and others, a cyclone 17 and a bag filter 18 for recovering cement component from gas exhausted from the separator 16 and an exhaust fan 19 for discharging the exhaust gas to atmosphere.

Next, a method for adding wet ash to cement according to the present invention with the cement grinding facility 1 described above will be explained.

The wet ash fed to the wet ash hopper 4 by the crane 2 is dewatered in advance with a dewaterer 20 such as a centrifugal separator 20 shown in FIG. 1. In this case, the water content of the wet ash is adjusted to 20 mass percent or below, preferably to 15 mass percent or below so as to sufficiently be dried by the ball mill 14.

The dewatered wet ash is fed to the wet ash hopper 4 by the crane 2. Next, the wet ash temporarily stored in the wet ash hopper 4 is fed together with gypsum in the gypsum hopper 3 to the pug mill 7 via the gypsum feeder 5 and the wet ash feeder 6, and is mixed with the gypsum in the pug mill 7. Under the condition, the wet ash and the gypsum have a certain amount of water, so that it is hard to separate them from each other, which allows targeted $SO_3$ content of cement and feeding rate of the wet ash to the ball mill 14 to be stabilized. The mixture of the gypsum and the wet ash discharged from the pug mill 7 is fed to the gypsum-wet ash hopper 8 through transporters and temporarily stored therein.

Next, the ball mill 14 is operated, and the clinker in the clinker hopper 10, the limestone in the limestone hopper 9 and the mixture of the gypsum and the wet ash in the gypsum-wet ash hopper 8 are fed at predetermined rate to the ball mill 14, and are finely ground. The wet ash is dried in the ball mill 14 by heat generated at the grinding. The motion of the cement grinding facility 1 downstream of the ball mill 14 is the same as a conventional cement grinding facility, so detailed description thereof will be omitted. The wet ash is finely ground by the ball mill 14, and is transported through the separator to finally compose a part of cement.

Meanwhile, in the above embodiment, the description was made in case that the dewatered wet ash is mixed with gypsum as one of the materials that are mixed with clinker and ground together and is fed to cement mill, as an example. Instead of gypsum, the wet ash can be mixed with additives such as limestone and slag when fed to the cement mill.

EXPLANATION OF SYMBOLS

1 cement grinding facility
2 crane
3 gypsum hopper
4 wet ash hopper
5 gypsum feeding device
6 wet ash feeding device
7 pug mill
8 gypsum-wet ash hopper
9 limestone hopper
10 clinker hopper
11 gypsum-wet ash feeder
12 limestone feeder
13 clinker feeder
14 ball mill
15 bucket elevator
16 separator
17 cyclone
18 bag filter
19 exhaust fan

The invention claimed is:

1. A cement grinding apparatus for adding wet ash from a wet ash source with a cement raw material stored in a hopper to form cement in a cement mill, the apparatus comprising:
   a dewaterer connectable to the wet ash source to receive the wet ash therefrom, and configured to reduce the water content of the wet ash;
   a mixer in operative communication with the dewaterer to receive wet ash therefrom and operatively connectable to the hopper to receive the cement raw material therefrom, the mixer being configured to mix said wet ash dewatered by the dewaterer with the cement raw material; and
   a ball mill in operative communication with the mixer to receive the mixed cement raw material and wet ash therefrom, the ball mill being configured to grind the mixture such that the grinding generates heat to dry the wet ash.

2. The apparatus as claimed in claim 1, wherein said dewaterer is a device selecting from the group consisting of centrifugal separators, vacuum dewatereres, hygroscopic-material-type dewatereres, electroosmosis-type dewatereres, air-substitution-type dewatereres and mechanical-expression-filtration-type dewatereres.

3. The apparatus as claimed in claim 2, wherein said mixer is a device selecting from the group consisting of pug mills, static-type mixers, body-rotation-type mixers and hoppers.

4. The apparatus as claimed in claim 1, wherein said mixer is a device selecting from the group consisting of pug mills, static-type mixers, body-rotation-type mixers and hoppers.

5. The apparatus as claimed in claim 1, wherein the dewaterer is configured to operate independent of directing heat onto the wet ash.

6. The apparatus as claimed in claim 1, wherein the dewaterer is configured to dewater the wet ash such that the water content of the wet ash is adjusted to 20% mass or below.

* * * * *